Figure 1:
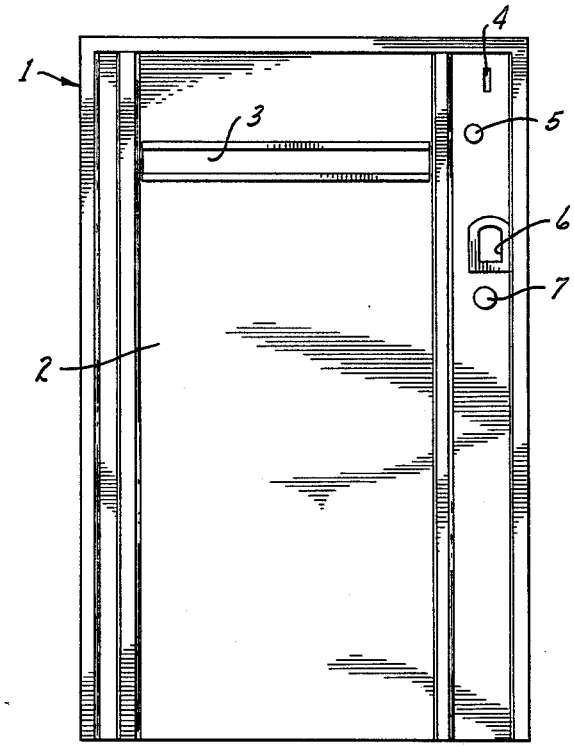

Nov. 6, 1962    R. P. KENT ET AL    3,062,406
DISPENSING APPARATUS
Filed April 6, 1960    8 Sheets-Sheet 1

INVENTORS.
RICHARD P. KENT
DANIEL NEIDIG
BY Parker & Carter
Attorneys.

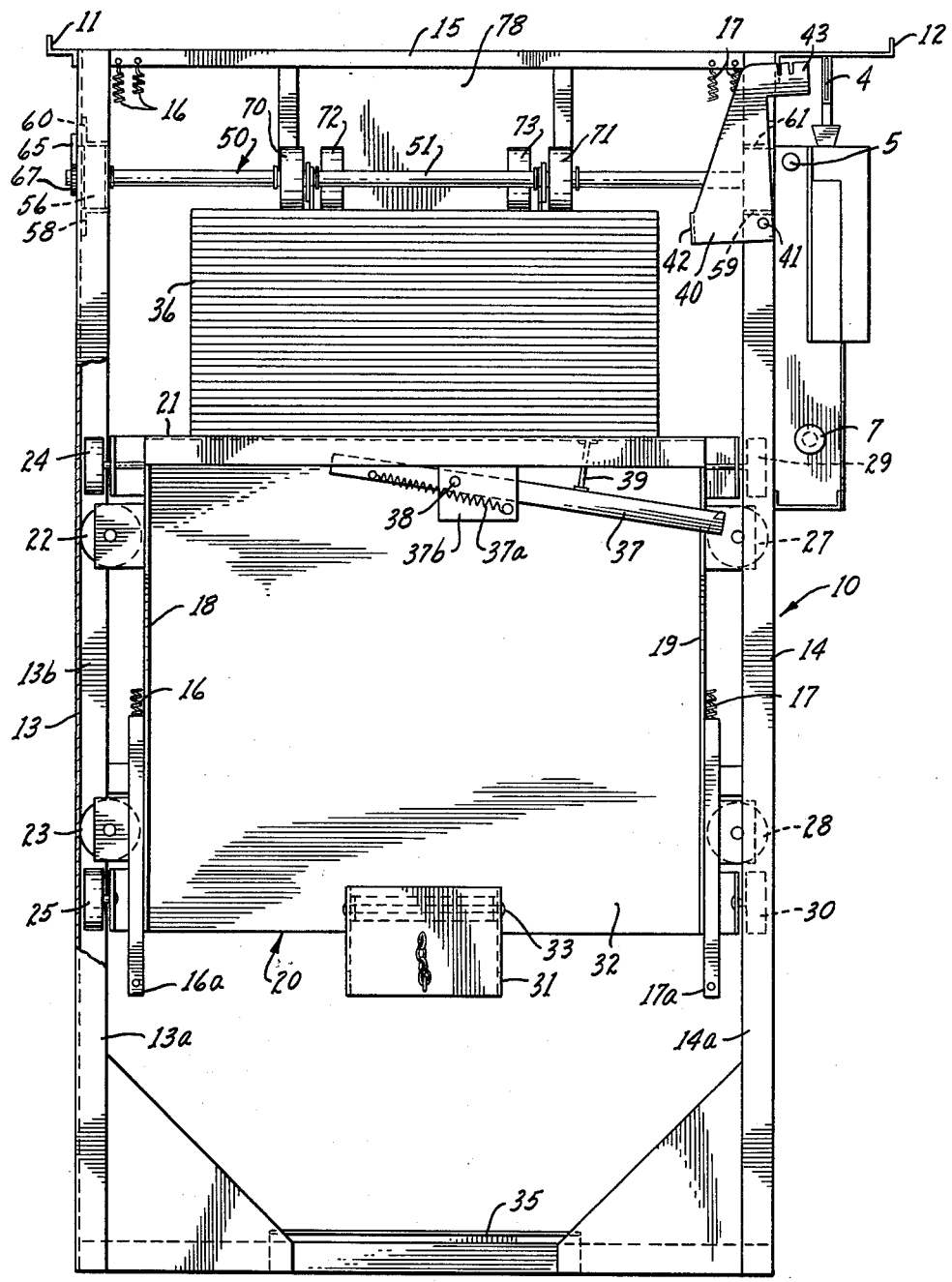

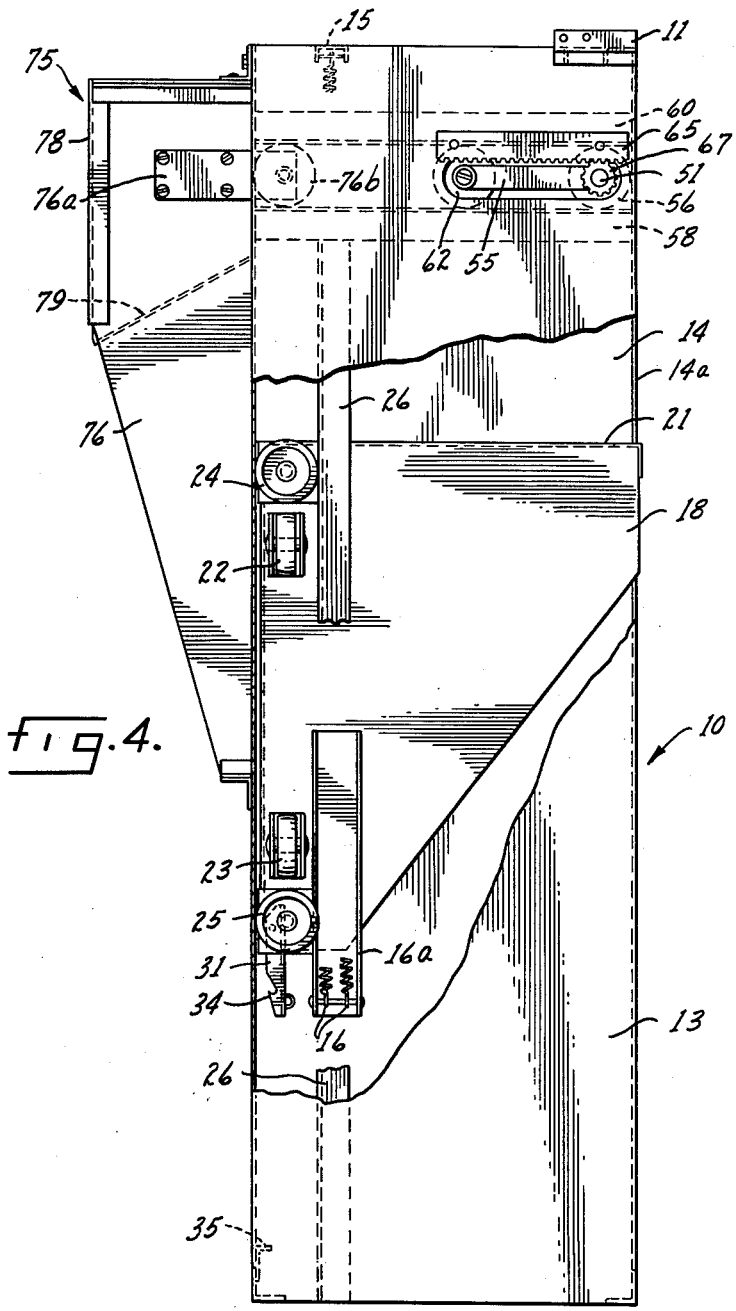

Nov. 6, 1962  R. P. KENT ET AL  3,062,406
DISPENSING APPARATUS
Filed April 6, 1960  8 Sheets-Sheet 4
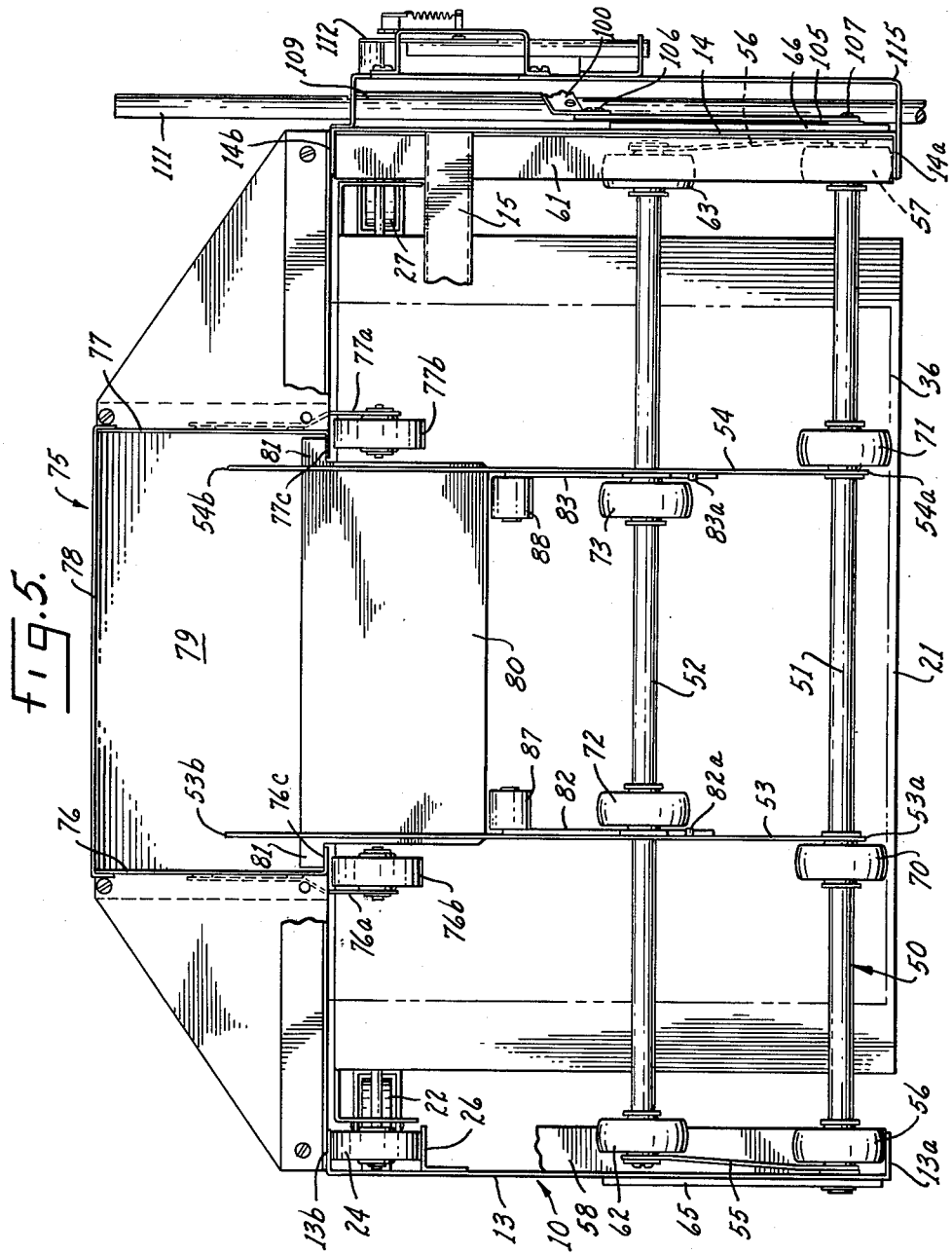
INVENTORS.
RICHARD P. KENT
DANIEL NEIDIG
BY Parker & Carter
Attorneys.

Nov. 6, 1962 R. P. KENT ET AL 3,062,406
DISPENSING APPARATUS
Filed April 6, 1960 8 Sheets-Sheet 5
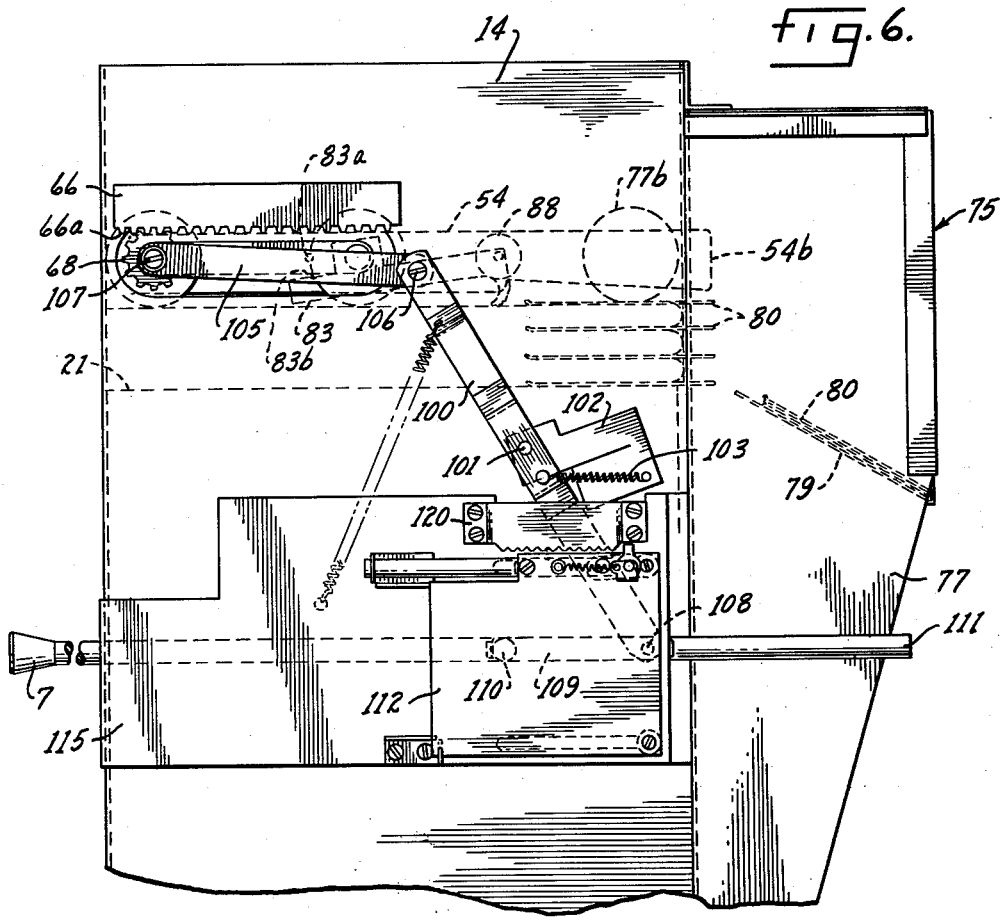
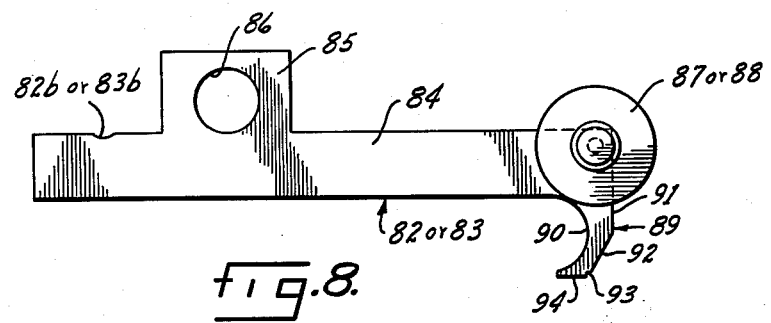
INVENTORS.
RICHARD P. KENT
DANIEL NEIDIG
BY Parker & Carter
Attorneys.

Nov. 6, 1962 R. P. KENT ET AL 3,062,406
DISPENSING APPARATUS
Filed April 6, 1960 8 Sheets-Sheet 6

INVENTORS.
RICHARD P. KENT
DANIEL NEIDIG
BY Parker & Carter
Attorneys.

Nov. 6, 1962  R. P. KENT ET AL  3,062,406
DISPENSING APPARATUS
Filed April 6, 1960  8 Sheets-Sheet 7
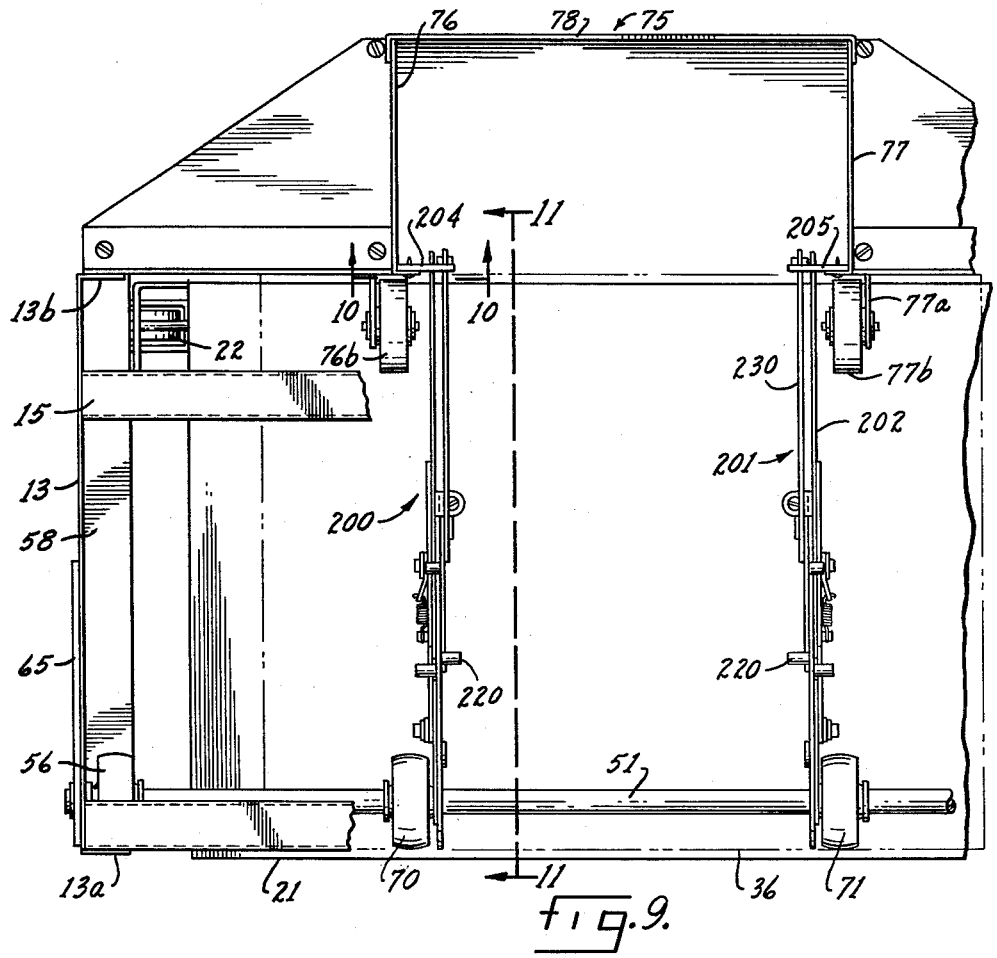
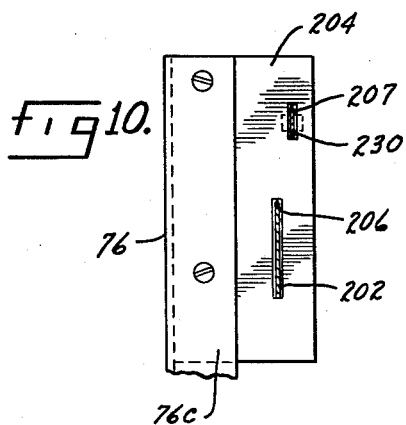
INVENTORS.
RICHARD P. KENT
DANIEL NEIDIG
BY *Parker & Carter*
*Attorneys.*

3,062,406
DISPENSING APPARATUS
Richard P. Kent, Glenview, Ill., and Daniel Neidig, New Albany, Ind., assignors to Vend-O-Print, Inc., Skokie, Ill., a corporation of Illinois
Filed Apr. 6, 1960, Ser. No. 20,316
5 Claims. (Cl. 221—88)

This invention relates to dispensing apparatus and has particular relation to a mechanism effective in dispensing newspapers and the like.

One purpose of the invention is to provide a mechanism usable in connection with coin-receiving vending machines and the sale and vending of newspapers.

Another purpose is to provide a device effective in the sale and vending of publications of various forms.

Another purpose is to provide a discharge mechanism for an item to be dispensed or vended from a coin-activated vending machine.

Another purpose is to provide a vending apparatus effective to cause the dispensing of a single item, from a plurality of items, in response to each individual operation of the vending device.

Another purpose is to provide a vending apparatus effective to discharge the item to be vended at a level adjacent the upper end of the device.

Another purpose is to provide a vending apparatus effective to discharge the item to be vended from the upper area of a supply of said items.

Another purpose is to provide a vending apparatus which shall be free of the effect of gravity upon the items to be vended in the course of vending said items.

Another purpose is to provide a coin-activated vending apparatus having means for preventing the reception of coins therein when said apparatus is empty of items to be vended.

Another purpose is to provide a vending apparatus having means for exerting continuous upward pressure upon a supply of the items to be vended.

Another purpose of the invention is to provide a vending apparatus having mechanism effective to insure the engagement and dispensing of a single item in response to each individual operation of said apparatus.

Another purpose is to provide a vending apparatus effective to dispense a single item from a supply of items having varying thicknesses and sizes.

Another purpose is to provide a vending apparatus having means for insuring that each individual operation thereof shall be completed before the next operation thereof is permitted.

Another purpose is to provide a vending apparatus of maximum simplicity and economy in construction and of minimum requirement for maintenance and repair.

Another purpose is to provide a vending apparatus for newspapers and the like which may be rapidly loaded and reloaded with items to be dispensed.

Other purposes will appear from time to time during the course of the specification and claims.

Figure 2:
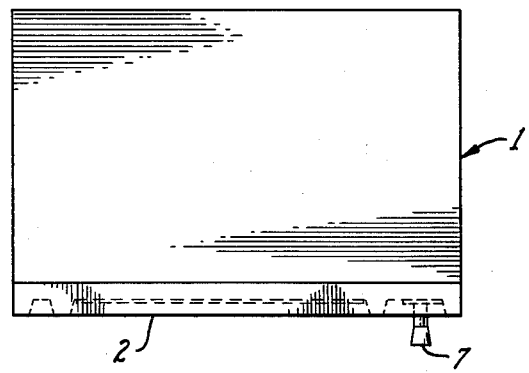
Figure 7:
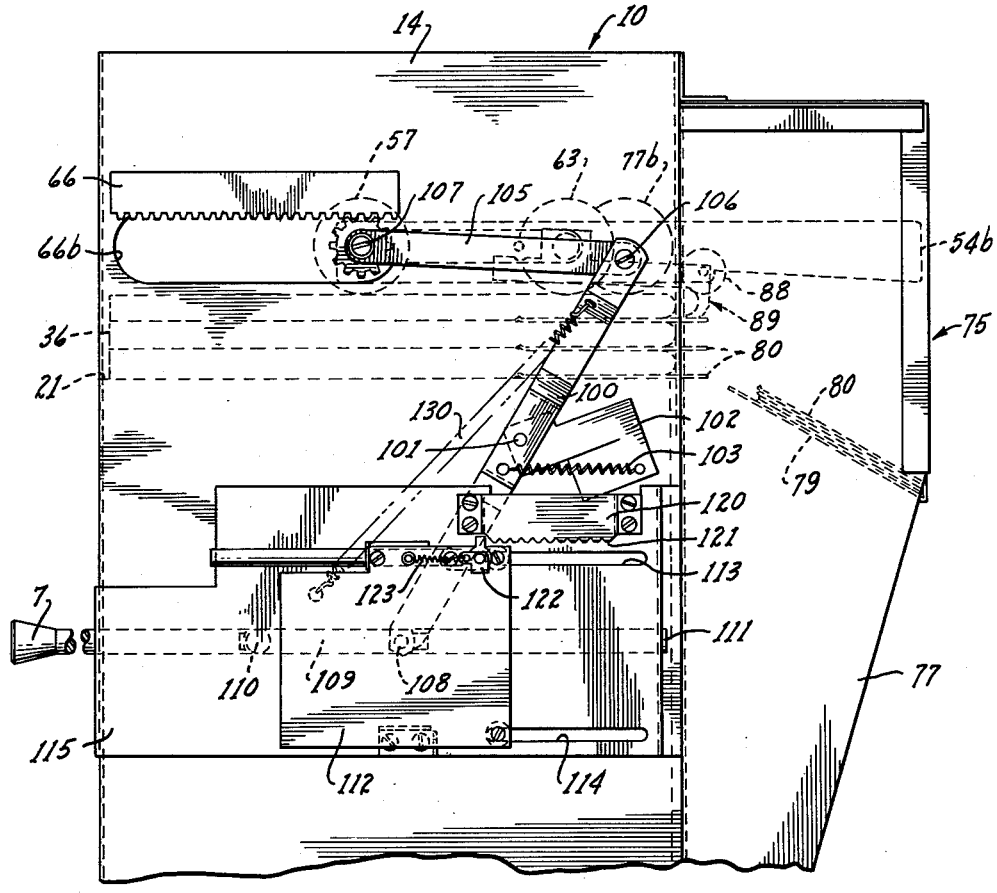
Figure 11:
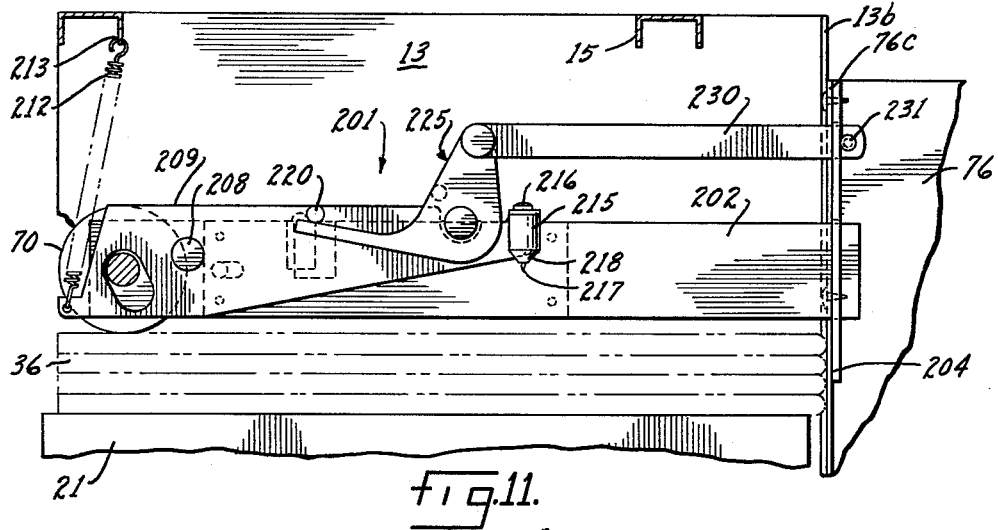
Figure 12:
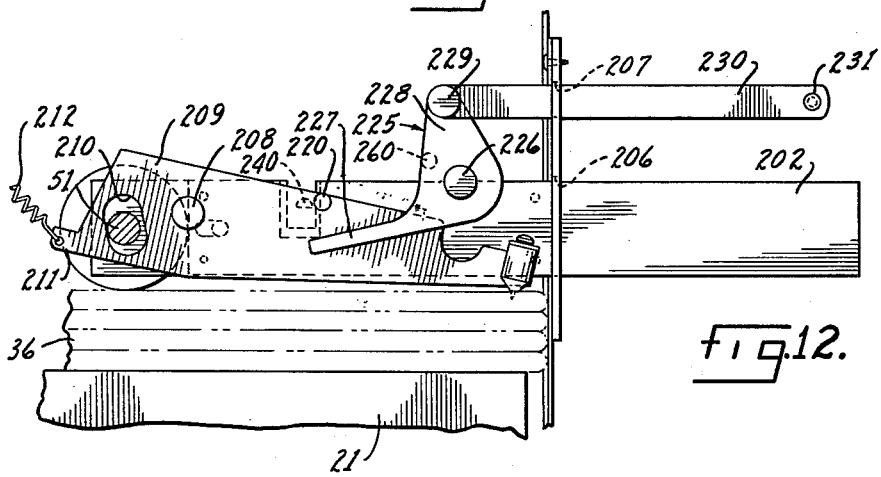
Figure 13:
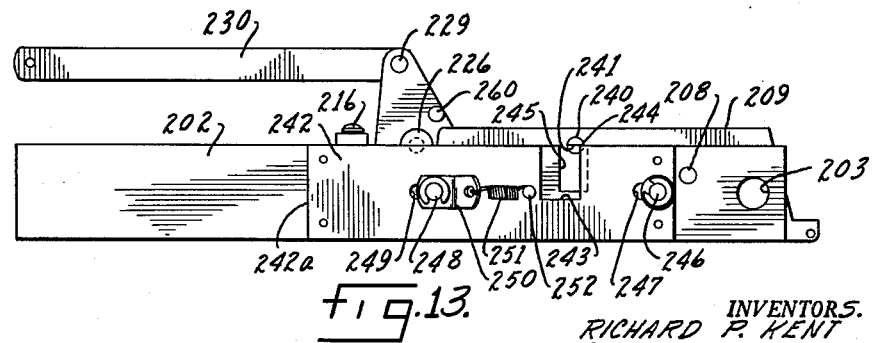

We illustrate the invention, more or less diagrammatically, in the accompanying drawings, wherein:

FIGURE 1 is a front elevation;
FIGURE 2 is a top view;
FIGURE 3 is a front view, in partial cross section, and on an enlarged scale;
FIGURE 4 is a side view with parts in cross section and parts broken away;
FIGURE 5 is a top plan view, with parts broken away, of the structure illustrated in FIGURE 3;
FIGURE 6 is a detail view illustrating the operating mechanism in one position;
FIGURE 7 is a view similar to that of FIGURE 6 and illustrating the mechanism in another position;
FIGURE 8 is a detail view of an element illustrated in FIGURES 6 and 7;
FIGURE 9 is a top plan view illustrating a variant form of certain elements of the invention;
FIGURE 10 is a view taken on the line 10—10 of FIGURE 9;
FIGURE 11 is a view taken on the line 11—11 of FIGURE 9;
FIGURE 12 is a view similar to that of FIGURE 11 with the parts in another position; and
FIGURE 13 is a detail view of the opposite side of a major element shown in FIGURE 11.

Like parts are indicated by like numerals throughout the specification and drawings.

Referring now to the drawings, and particularly to FIGURE 1, a cabinet is illustrated generally at 1. The cabinet 1 has a front wall 2 adjacent the upper edge of which a discharge slot 3 is formed. To one side of the discharge slot 3 and within the upper portion of the wall 2 are positioned a coin-receiving slot 4, a bent coin release button 5, a change-receiving cup 6, and an operating pull handle 7.

Ilustrated in FIGURE 3 is an entire, cartridge-like mechanism adapted for removable installation in the cabinet 1. Illustrated generally at 10 is a supporting frame. The frame 10 carries along its upper edges positioning flanges 11, 12 dimensioned to fit snugly within the cabinet 1 and to position the frame 10 in predetermined location therein. The flanges 11, 12 are secured and extend outwardly from adjacent the upper edges of a pair of spaced vertical frame elements 13, 14. The elements 13, 14 each include inwardly extending forward flange portions 13a, 14a, respectively. As best seen in FIGURE 5, the members 13, 14 may be arranged in the form of side panels carrying at their rear edges inwardly turned flange portions 13b, 14b, respectively. It will be understood that the forward and rear portions of the members 13, 14 could be formed separately, with appropriate joining elements extending therebetween without departing from the nature and scope of the invention.

An upper cross-frame member 15 extends between the members 13, 14 adjacent the rear upper portions thereof. Secured to the member 15 and extending downwardly therefrom adjacent the side frame member 13 is a pair of springs indicated at 16. A similar pair of springs 17 are secured to the member 15 and extend downwardly therefrom alongside and within the frame member 14. The springs 16, 17 are secured at their opposite lower ends to the lower end portions of U-shaped plates 16a, 17a, respectively. The plates 16a, 17a are in turn fixed to the side panels 18, 19, respectively, of an elevator structure indicated generally by the numeral 20. The elevator 20 has a platform 21 extending between and secured to the spaced upper edges of the plates 18, 19.

The elevator frame panel 18 supports a pair of spaced rollers 22, 23 having their circumference in contact with the inner surface of main frame element 13. A second set of spaced rollers 24, 25 is supported on the member 18 and the rollers 24, 25 have their circumference in rolling contact with the inner surface of flange 13b. As best seen in FIGURE 5, the rollers 24, 25 are also in contact with the surface of an angle-piece 26 secured to the inner surface of frame member 13. A similar set of rollers 27, 28, 29 and 30 are similarly arranged in association with the elevator frame panel 19 and main frame portion 14. The rollers 24 through 30 serve as guide means for the elevator 20 in its excursion vertically within the frame 10.

A catch plate 31 is pivotally supported adjacent the lower edge of an elevator frame rear panel 32 which extends between the side panels 18, 19 and is of equal vertical dimension therewith. Catch plate 31, pivoted as at 33, extends beneath the lower edge of panel 32 and contains a downwardly extending hook portion, illustrated best at 34 in FIGURE 4. A fixed catch plate 35 is fixed to the frame 10 adjacent its lower rear center portion and positioned to engage the hook 34 when the elevator is at its lowermost position and thus to hold the elevator in said position for loading with the items to be dispensed. The items to be dispensed, for example the newspapers arranged in a stack indicated at 36, are positioned on top of the elevator platform 21.

An actuating finger 37 is pivotally supported beneath the platform 21, as at 38. A sensing finger 39 is fixed to the member 37 and extends upwardly through platform 21 into contact with the lowermost of the newspapers in the stack 36. A coin slot masking plate 40 is pivotally supported, as at 41, on the member 14 and carries a contact abutment 42 spaced from the pivot 41 and vertically aligned for contact by finger member 37. The member 40 has a slot-masking extension 43 spaced from pivot point 41.

A discharge frame is indicated generally at 50. The frame 50 includes a pair of laterally extending spaced axles 51, 52. A pair of strip members 53, 54 extend in parallel spaced relationship perpendicularly to the axles 51, 52, and substantially centrally thereof. The members 53, 54 are apertured to receive the axles 51, 52 and extend substantially the full depth of the frame 10 and therebeyond, each having one end joined to the axle 51 as indicated, for example, at 53a, and 54a and the other end extending rearwardly of the frame 10, as indicated at 53b, 54b. Tie plates or strips 55, 56 join the ends of axles 51, 52. Guide wheels or rollers 56, 57 are rotatably positioned at the opposite ends of axle 51 and roll in tracks formed by lower plates 58, 59 and upper plates 60, 61, respectively, supported on the spaced frame elements 13, 14. The tracks formed by elongated plates 58, 60 and 59, 61 also receive rollers 62, 63 rotatably mounted at the opposite ends of axle 52.

Rack bars 65, 66 are supported, respectively, on the outer upper surfaces of the frame elements 13, 14 with downwardly disposed teeth, as illustrated in part at 65a in FIGURE 6. The axle 51 extends outwardly through appropriate slots such as that illustrated at 66b in FIGURE 7, and the opposite ends of axle 51 carry gear elements 67, 68 in position for engagement with the gear rack bars 65, 66, respectively.

Rotatably mounted on the discharging frame formed by the members 51, 52, 53, 54 is a plurality of contact rollers positioned to engage the uppermost of the items to be dispensed. These contact rollers may comprise a pair of spaced rollers 70, 71 positioned outwardly of the members 53, 54 on the axle 51 and a second pair of spaced contact rollers 72, 73 positioned inwardly of the members 53, 54 on axle 52.

A sub-frame or enclosure, generally indicated at 75, extends rearwardly from the frame 10 and includes a pair of spaced parallel wall or panel portions 76, 77 extending rearwardly from the rear of frame 10 on opposite sides of the members 53, 54. The side walls 76, 77 are joined by a rear wall 78 and a bottom wall 79 extends in an upwardly inclined, forwardly extending plane from the lower edge of wall 78 to a point adjacent the rear of frame 10, as best seen in FIGURES 6 and 7. Brackets 76a, 77a are fixed to the outer surfaces of walls 76, 77, respectively, and extend forwardly to a point overlying the rear edge of the stack 36 at which points the brackets respectively support rollers 76b, 77b, respectively, the lower edges of rollers 76b, 77b being in substantial alignment with the lower edges of the rollers 70, 71, 72 and 73.

A plurality of spacer plates 80 are alternately positioned with and between the items in stack 36. Each of the plates 80 has outwardly or laterally, oppositely extending ears 81 at its rear edge and is of sufficient width or extension to overlie a substantial rear portion of the items in stack 36 between and just beneath the members 53, 54.

Each of the members 53, 54 pivotally carries a parallel extending, discharging finger member, the same being indicated at 82, 83. One of the finger members 82, 83 is illustrated in detail in FIGURE 8 and comprises an elongated portion 84 carrying, intermediate its ends, an upstanding portion 85 apertured as at 86 to provide for pivotal mounting on axle 52 between one of the adjacent rollers 72, 73 and the associated member 53 or 54. At its rear edge each of the finger elements carries a roller indicated respectively at 87, 88. Each of the fingers 82, 83 carries at its rear edge a downwardly extending discharge hook portion 89 having an inner arcuate edge 90, a straight outer or rear vertical edge portion 91 terminating in a forwardly, downwardly inclined edge portion 92 which in turn has an inwardly offset or recessed terminus indicated at 93. A flat bottom edge, paralleling that of portion 84, is indicated at 94.

Referring now to the manually operable discharge actuating mechanism illustrated primarily in FIGURES 6 and 7, a main lever 100 is pivoted, as at 101, to a bracket 102 supported on the frame 10. A yielding means is secured to the lever 100 beneath pivot 101 and to the bracket 102 as indicated generally at 103 to urge the lever in counterclockwise rotational direction. A link 105 has its opposite ends pivotally connected to the upper end of lever 100 as at 106 and to the outer end of axle 51 outwardly of rack bar 66, as indicated at 107, the link 105 extending in a plane substantially parallel with that of the discharge frame members 53, 54. The opposite end of lever 100 is pivotally connected as at 108 to a second link 109 which is in turn pivotally connected as at 110 to the push-pull operating rod 111, the forwardly, outwardly extending portion of which is connected to manually-operable pull handle 7, referred to in connection with FIGURE 1.

A plate 112 is movable with the rod 111, a pair of spaced parallel slots 113, 114 being formed in a mechanism-supporting side plate 115 to serve as guide means for the plate 112. It will be understood that the plate 112 is associated with a coin-handling mechanism (not shown) associated with the dispensing mechanism of my invention.

A ratchet 120 is mounted on the plate 115 above plate 112 and carries downwardly directed ratchet teeth 121. Mounted adjacent the upper rear edge of plate 112 is a pivoted pawl member 122. A yielding means 123 is connected to the pawl 122 and plate 112 and is effective to urge the pawl into the vertical position indicated in FIGURES 6 and 7. It will be observed that the pawl 122 is disengaged from the ratchet teeth 121 when the plate 112 is at the opposite ends of its travel. Thus, as the plate 112 moves from left to right, for example, as the parts are shown in the drawings, the pawl 122 is effective to engage the teeth 121 and to prevent retrograde movement from right to left of the plate 112. When the plate 112 has reached the limit of its travel from left to right, however, the pawl 122 is returned to vertical position, having passed beyond the teeth 121, and thereafter, as the plate 112 is moved from right to left the pawl is effective to engage teeth 121 and to prevent left-to-right movement until the plate 112 has completed its entire travel from right to left.

A second yielding means 130 may be secured at one of its ends to frame panel 14 and may extend upwardly to engage the lever 100 adjacent its upper end to aid in urging the lever 100 toward counterclockwise rotation.

While the items in stack 36 are illustrated as presenting a folded rear edge to the finger members 82, 83 it has been found that the invention is capable of discharging newspapers, magazines and similar items with said items arranged with open ends to the rear and with random arrangements in which individual items may have any edge presented to the members 82, 83 and may be of different dimensions and thicknesses.

Referring now to FIGURES 9–13, inclusive, a variant form of means for propelling the item to be dispensed is illustrated.

In this form of the invention, the rod 52 and rollers 72, 73 are removed and the elements 82, 83 and 53, 54 are similarly removed. In their place there is provided a pair of identical assemblies indicated generally in FIGURE 9 by the numerals 200, 201. Since the structures 200, 201 are substantially identical, it will suffice, for convenience, to describe the assembly 200.

A relatively thin, elongated, rectilinear strip or plate member 202 has a circular aperture 203 adjacent its forward end through which the rod 51 extends. The member 202 is of sufficient linear extension to bridge between the forward edge or wall 2 of the frame 1 to a point just rearwardly of the rear edge of the platform 21 when the rod 51 is in its most forward position, as illustrated in FIGURE 9. A plate 204 may be secured in any suitable manner to frame 1 in alignment with the member 200, it being understood that an identical plate 205 is similarly positioned in relation to assembly 201. The plate 204 is positioned immediately adjacent and above the rear edge of platform 21 and carries vertical slot 206 through which a rear portion of member 202 extends. A second slot, which may be of lesser dimension than a second slot 207, which may be of lesser dimension than slot 206, is similarly positioned above and may be positioned to one side of the vertical line of slot 206 in plate 204, as best seen in FIGURE 10. Pivotally supported, as at 208, on the member 202 and adjacent the forward portion thereof, is a grab-arm 209. The arm 209 has an elongated slot 210 positioned forwardly of pivot point 208, the rod 51 extending through the slot 210, the latter being in alignment with aperture 203 in member 202 and being of sufficient elongation to permit the pivoting of member 209 on member 202. An ear 211 extends forwardly from the forward edge of member 209 and a yielding means such as the spring 212 has its opposite ends secured to the ear 211 of member 209 and to a fixed portion of the frame 1 as indicated at 213 in FIGURE 11. It will be observed that the spring 212, when the assembly 200 is in its foremost position, as illustrated in FIGURE 11, rises substantially vertically and slightly rearwardly from the ear 211.

The arm 209 carries adjacent its rear end an item-grasping member indicated generally at 215. The member 215 may, for example, comprise a substantially cylindrical housing carrying a needle or pin element 216, the sharpened or pointed end 217 of which extends downwardly from the conical lower surface 218.

Intermediate its ends, the arm 209 has an abutment 220 extending from a point adjacent its upper edge inwardly toward the center line of the frame 1.

A bell crank member 225 is pivoted as at 226 intermediate the ends of and adjacent the upper edge of the member 202 and outwardly of arm 209 from member 202.

The member 225 has an arm 227 underlying the abutment 220 of member 209 and an angularly disposed segment or arm portion 228 uprising from the upper edge of member 202. Pivotally connected, as at 229 to the upper edge of arm 228 is a rod or strip 230 which extends from the pivot point 229 substantially paralleling member 202 and rearwardly from the pivot point 229 through the slot 207 in member 204. The strip 230 carries abutment 231 adjacent its rearmost end to assure against escape of the strip 230 from slot 207 when the assembly 200 moves to its foremost position, as illustrated in FIGURE 9.

Extending in the opposite direction from abutment 220 on member 209 is a second abutment or pin element 240 having a flattened undersurface 241, the member 240 extending from a point intermediate the ends of arm 209 and adjacent the upper edge thereof. An elongated strip 242 is slidably mounted on the opposite vertical surface of member 202 from that on which member 209 is pivotally mounted. The slide 242 has its upper edge co-planar with the upper edge of member 202 and the upper edge of member 242 is broken by a vertically downwardly disposed opening or slot 243, the undersurface 241 of abutment 240 being positioned to rest upon and be supported by the upper edge of member 242 adjacent one edge of slot 243, as indicated at 244 in FIGURE 13. A slot 245 is formed in member 202 and intersects the upper edge thereof in direct alignment with abutment 240. 246 is a guide pin extending through longitudinally extending slot 247 formed in slide 242.

A second fixed pin 248 extends through longitudinally extending slot 249 formed in slide 242. The pins 246 and 248 are fixed to member 202. A bracket 250 is secured to pin 248 outwardly of slide 242 and a yielding means such as the spring 251 is secured to bracket 250 and to pin 252 fixed on slide 242 between the bracket 250 and the vertical slot 243.

Indicated at 260 is a stop abutment positioned adjacent a forward edge of arm 228 of member 225 and extending over the upper edge of member 202 to limit the downward travel of arm 227 so as to prevent contact thereof with the uppermost item in stack 36.

The use and operation of the invention are as follows:

With the elevator structure 20 in its lowermost position and held in such position, for example, by the hook 34 and plate 35, the items to be dispensed, such as newspapers, magazines or the like, are arranged in a stack in the manner indicated at 36 in FIGURE 3. As indicated in broken lines in FIGURE 5, the items in stack 36 underlie rollers 70—73, and fingers 82, 83. It will be realized that FIGURE 3 illustrates the invention with approximately half of the items capable of being dispensed having already been discharged. With the elevator 20 in its lowermost position, a stack substantially twice the height of stack 36 may be positioned on elevator 20, if such volume were desired, the stack 36 extending from the elevator platform 21 to the rollers 70, 71, 72 and 73. The hook 34 is then disengaged from plate 35 and the springs 16, 17 are effective to urge the elevator 20 upwardly and to urge the stack 36 against the rollers 70, 71, 72 and 73.

As the items to be dispensed were arranged on platform 21, an individual separator plate 80 was pulled from a supply thereof resting on inclined bottom wall 79 of the separator-receiving bin and placed atop each of the items to be dispensed, the ears 81 of each plate being positioned against inwardly turned flanges 76c, 77c of walls 76, 77.

With the dispensing mechanism loaded, the upper surface of the uppermost item in stack 36 is in contact with the surface 94 of the discharging fingers 82, 83 to hold the fingers 82, 83 in the position illustrated in FIGURE 6, with the hook portion 89 held upwardly in relation to pivot 86. Similarly, the discharge operating mechanism is in the position illustrated in FIGURE 6.

The user desiring to obtain one of the items from the dispensing mechanism of the invention places a suitable coin or number of coins in the coin slot 4. A suitable coin-receiving and handling mechanism (not shown) is provided to arrange for freeing plate 112 and handle 111 for movement in response to the presence of the predetermined number or type of coins in such coin handling mechanism.

Thereafter, the operator pulls upon handle element 7 and draws rod 111 outwardly from the mechanism, or from right to left as the parts are illustrated in FIGURES 6 and 7. Such excursion of rod 111 causes a clockwise rotation of lever 100 through the mediation of link 109. Clockwise rotation of lever 100, through mediation of link 105, draws the entire discharging frame mechanism 50 to the rear of frame 10, or from left to right as the parts are shown in FIGURES 6 and 7. When frame 50 has been brought to the limit of its rearward travel, as indicated in FIGURE 7, the fingers 82, 83 are permitted to drop or rotate in clockwise direction, as the parts are indicated in FIGURES 6 and 7, it being observed that the pivot points 86 of fingers 82, 83 are positioned beyond the center point of the finger portions 84 from the hook portions 89 and roller weights 87, 88 assist in the gravitational rotation of fingers 82, 83. A stop pin 82a, 83a may be provided for contact by abutment recess 82b, 83b to limit downward travel of hooks 89 and to provide a rest for fingers 82, 83 when counter-rotated out of the way to facilitate loading of elevator 20. Since the hook portions 89 of fingers 82, 83 have reached a point rearwardly beyond the frame 10 and beyond the items to be dispensed, they are no longer held upwardly by the upper surface of the top item in stack 36. When the finger hook portions 89 drop downwardly, they come to rest on the then uppermost of the plates 80 which are positioned in the stack 36 between each two of the items to be dispensed, the lower generally horizontal foot portions 94 of the hooks 89 resting squarely on the rear portion of the uppermost plate 80 inwardly of the ears 81 thereof and in substantial alignment with said ears 81. The uppermost plate 80 at this operational stage will be immediately beneath the uppermost, or next-to-be-dispensed item in stack 36.

With the parts thus positioned in the manner illustrated in FIGURE 7, the operator then pushes rod 111 inwardly, or from left to right as the parts are shown in FIGURE 7. In so doing, the operator causes counter-clockwise rotation of lever 11 which, in turn, returns frame 50 to the original position illustrated in FIGURE 6. The return of the frame 50, carrying the fingers 82, 83, causes movement of finger portions 89 along the surface of the uppermost of the plates 80 in stack 36 and the discharge of the uppermost of the items in stack 36 outwardly through discharge slot 3, the curved hook surface 90 being effective to engage the rear edge of the uppermost item in stack 36 as the fingers 82, 83 are returned forwardly, or from right to left as the parts are shown in FIGURES 6 and 7. As shown, the item being dispensed is moved to a position having only a portion extending through discharge slot 3, the user grasping this portion and manually withdrawing the remainder of the item with ease in view of the rolling contact with members 70—73.

The fingers 82, 83 are moved to a point forwardly of the forward edge of the uppermost plate 80 in stack 36 and are, therefore, again held in the position illustrated in FIGURE 6 by the upper surface of the uppermost item in stack 36.

When the uppermost item in stack 36 is discharged through slot 3 the springs 16, 17 are effective to move the elevator 20 upwardly for a distance corresponding substantially to the thickness of the item so dispensed and this process is continued, of course, until the last item in stack 36 has been dispensed. In this manner also, and in cooperation with the presence of a separator member 80 between each two items to be dispensed, it will be seen that a stack of items varying in individual thickness may be dispensed as easily as a stack formed of items identical in thickness.

The operation just described is repeated to accomplish the dispensing of each of the items, in sequence, from top to bottom of stack 36. It will be observed that the recesses 93 in the rear edges 92 of hook portions 89 of fingers 82, 83 are positioned to engage the forward edge of the uppermost plate 80 when the fingers are first moved from forward to rear position, or from left to right as the parts are illustrated in FIGURES 6 and 7. In such rearward movement of fingers 82, 83 with frame 50, the recess 93 is effective to discharge the uppermost plate 80 which rests upon the uppermost item in stack 36 to the rear of frame 10 and to cause it to fall by the action of gravity onto the receiver wall 79 and, as the process is repeated, each of the plates 80 is caused to fall into a stack of such plates on the wall 79 in position to be reinserted in a new stack 36 when the elevator 20 is again loaded.

It will also be observed that motion of rod 111 outwardly from frame 10 must be completed to its entire travel in order to insure that finger portions 89 will drop into position of alignment with the uppermost item to be dispensed and into position at rest upon the plate 80 beneath such item to be dispensed. The ratchet and pawl 121, 122 is effective to prevent the operator from pushing rod 111 inwardly to attempt dispensing of an item from stack 36 until rod 111 has reached its full outward travel and thus until the finger portions 89 are in position to engage such item. Similarly, the same ratchet and pawl 121, 122 are effective to insure alignment of recess 93 with the forward edge of the plate 80 resting upon the upper item in stack 36 at the termination of the dispensing movement.

When the last item in stack 36 has been dispensed, the finger 39 is permitted to rise upwardly above platform 21 in response to the action of a spring 37a secured to a bracket 37b and to finger 37. When this happens, the elevator 20 is at its uppermost position and rotation of finger 37 in counterclockwise direction, as the parts are illustrated in FIGURE 3, brings the outer end of member 37 into actuating contact with abutment 42 on member 40 and causes clockwise rotation of member 40 to bring slot-masking extension 43 into position overlying the coin-receiving slot 4, and thus to prevent insertion of coins in the mechanism of the invention until such time as the elevator 20 has again been lowered and reloaded.

Referring to FIGURES 9–13, it will be observed that the rod 51 is actuated by the mechanism above described and illustrated, for example in FIGURE 6. As the rod 51 moves rearwardly, the members 202 and 230, considering assembly 200 for illustrative purposes, it being understood that both assemblies 200 and 201 function identically and simultaneously, move rearwardly through the slots 206, 207. The rear edge 242a of slide 242 is positioned forwardly of the rear edge of member 202 and rearwardly adjacent the item-penetrating element 215 on arm 209. Since the slot 206 is of just sufficient width to permit the passage therethrough of the rear segment of arm 202, when the rear edge 242a reaches the plate 204 it is held against further rearward movement. The arm 202, however, in response to rearward movement of rod 51, continues to move rearwardly through the slot 206 and the slide 242 is effectively moved forwardly in relation to arm 202 against the retarding action of spring 251. It will be observed that only a small forward segment of the undersurface 241 of abutment 240 rests upon the upper edge of slide 242 adjacent an edge of slot 243 therein. Thus, the slide 242 is moved relatively with respect to member 202 only a very slight distance for the slide to be moved out of alignment with abutment 240 and thus to permit the abutment 240 to move downwardly in slot 245 formed in member 202. The downward movement of abutment 240 is occasioned by the rotation of arm 209, in response to yielding means 212, the moment of the arm 209 extending from the pivot point 208 to the item-penetrating member 215 and the unlocking of abutment 240 as just described. It will be observed that the spring 212 has one of its ends fixed, as at 213, to the frame 1. Thus, as assembly 200 moves rearwardly with rod 51 the spring 212 is stretched, as partially indicated in FIGURE 12, the force thereof tending to rotate arm 209 thus increasing. As best seen in FIGURE 12, the unlocking of abutment 240 and the positioning of the parts as just described, causes a rapid driving of the item-penetrating pin or sharpened element 217 into the uppermost item on the stack 36 to be dispensed. The depth of penetration of the item to be dispensed is, of course, adjustable, being controlled by the extension of member 217 beneath the undersurface 218 of an element such as that indicated at 215. A positive penetration is achieved of the item to be dispensed by the needles or pins or other penetrating elements associated with the arms 209 on the assemblies 200, 201, the positive penetration being accomplished adjacent a rear edge of the uppermost item in stack 36.

As the rod 51 is thereafter moved forwardly again, it carries with it the assemblies 200, 201. As the member 202, for example, moves forwardly again through slot 206, the parts are in the position illustrated in FIGURE 12 and the uppermost item in stack 36 is moved forwardly with the arm 202, the absolute and positive penetration of the element 217 with the item to be dispensed being effective for this purpose. Thus, the forward portion of the upper item to be dispensed is urged through the dispensing slot 3 in the forward wall 202 of console or frame 1.

The strip 230 moves forwardly through slot 207 in cooperation and simultaneously with the forward motion of arm 202 through slot 206. As the abutment 231 is brought into contact with the rear surface of plate 204, continued forward motion of strip 230 is precluded. The member 202, however, continues to move forward a slight distance and in so doing causes a clockwise rotation, as the parts are illustrated in FIGURES 11 and 12, of the bell crank 228, thus bringing the upper surface of arm 227 into contact with abutment 220 on arm 209 and raising the abutment 220 and with it the arm 209 into the cocked position illustrated, for example, in FIGURE 11. The location of abutment or pin 240 extending through slot 245 and slot 243 of slide 242 while the arm 209 was in engagement with the item to be dispensed, prevented the return of slide 242 to the position illustrated, for example, in FIGURE 13, in response to urging toward that position by spring 251. As the bell crank 225, however, was rotated to raise the arm 209 to the position illustrated in FIGURE 11, the abutment 240 was brought out of the slot 243 of slide 242 and the slide 242 was thus permitted to return to its locking engagement with abutment 240, as illustrated in FIGURE 13, in response to urging of spring 251. The re-cocking of the item-engaging structure thus described is rendered relatively easy by the relaxation of spring 212 as the assembly 200 moves again toward the forward position. When the rod 51 has again reached its foremost position, the parts have returned to FIGURE 11 and have been cocked in preparation for the next dispensing action. The spring-loaded platform 21 will have moved the stack 36 upwardly to present the next item to be dispensed beneath the penetrating elements 217.

Since the uppermost item of the stack 36 is accurately and positively engaged by the members 217, no necessity exists for the separator plates 80 illustrated in FIGURE 5, for example. Thus, the platform 21 and the cartridge illustrated herein which includes the platform 21 may be very rapidly loaded with newspapers and the like to be dispensed, there being no need for interpositioning a plate 80 between each two adjacent items to be dispensed. Particularly in relation to newspapers dispensed on street corners and the like, the time factor in distributing many thousands of newspapers in a minimum period is of extreme economic and competitive importance. Thus, the provision of a dispensing apparatus which is fully effective to accomplish the individual dispensing of items such as newspapers, while permitting a rapid loading of such apparatus, is advantageous. Loading of the invention, employing the device as illustrated in FIGURES 9–13, is accomplished by the mere lowering of platform 21 and the placing of the items to be dispensed in a stack thereon, thereafter allowing the platform 21 to be urged upwardly beneath the stack 36 by yielding means such as those illustrated at 16, 17.

Whereas there has been described and claimed a practical and operative device, nevertheless many changes may be made in size, shape, number and disposition of parts without departing from the nature and scope of the invention. The description and drawings should, therefore, be taken as in a broad sense illustrative or diagrammatic rather than as limiting the invention to the precise showing.

We claim:

1. In a dispensing device, a supporting frame, a substantially horizontal platform movable mounted in said frame, yielding means urging said platform in an upward direction, a dispensing mechanism horizontally movable in said frame above said platform, a plurality of items to be dispensed mounted one atop the other on said platform and yieldingly urged by said means upwardly against said dispensing mechanism, a plurality of separator plates interpositioned between said items in said stack, said separator plates having portions extending rearwardly of said stack, said dispensing mechanism having an item-engaging element positioned to seat upon the uppermost of said rearwardly extending separator portions when said dispensing mechanism has reached the limit of its travel in one direction.

2. The structure of claim 1 characterized by and including means on said dispensing mechanism for engaging the forward edge of the uppermost of said separator plates when said dispensing mechanism initiates its movement in said last-named direction.

3. A discharge mechanism for discharging items from above a stack of items to be discharged, said mechanism comprising a support, an elongated member reciprocal on said support above the said stack of items to be discharged, an arm pivotally carried adjacent one end of said elongated member, yielding means secured to said frame and to said arm and effective to urge said arm in one direction about its pivot, locking means carried by said reciprocal member and effective to retain said arm against the action of said yielding means, means for disengaging said locking means when said reciprocal member has reached a predetermined point in its reciprocation in its movement in one direction, item-engaging means positioned to be driven into engagement with the uppermost item on said stack in response to action of said yielding means when said locking means is disengaged, and means carried by said reciprocal member for automatically returning said arm to its original position and for re-engaging said locking means when said reciprocal member has reached a predetermined point in its movement in the opposite direction.

4. The structure of claim 3 wherein said reciprocal member comprises an elongated, rectilinear strip, said locking means comprises a second strip slidably mounted on said first strip, and an abutment carried by said arm, said first and second strips carrying slots alignable with said abutment when said locking means is disengaged, said slidably mounted strip carrying a slot partially alignable with said abutment when said locking means is engaged, said item-engaging means comprises a downwardly directed pointed member positioned to penetrate the uppermost item to be discharged, and said arm-returning and lock re-engaging means comprises a bell crank pivotally carried by said first strip, an abutment carried by said arm in alignment with one arm of said bell crank and a third strip slidably engaging said frame to urge said bell crank arm into engagement with said arm abutment and thereafter to urge said arm toward its original position.

5. A vending apparatus comprising a frame, a platform yieldingly upwardly urged in said frame and adapted to support a stack of items to be vended on the upper surface of said platform, a pair of spaced strip members slidably mounted on said frame adjacent the upper portion thereof and above said platform and said stack of items to be vended, said strip members each pivotally carrying a downwardly directed pointed element, means yieldingly urging said pointed element downwardly toward the uppermost item on said stack, said yielding means being subjected to increased tension as said spaced strip members are moved in one direction on said frame above said stack, means carried by said strip and said pivoted members for holding said sharpened elements out of engagement with the uppermost item on said stack when said strips are in one position on said frame, means for automatically disengaging said holding means when said strips have reached another predetermined position in their movement in one direction on said frame above said stack, means for moving said strips, with said pointed elements in interpenetrating relationship with the uppermost item of said stack in the opposite direction, and means for disengaging said pointed elements from said uppermost item in said stack when said strips and said uppermost item have reached a predetermined position in the course of movement of said strips in the opposite direction, said means being effective automatically to re-engage said locking position when said pointed elements have reached a predetermined position of disengagement from said uppermost item.

References Cited in the file of this patent

UNITED STATES PATENTS

| | | |
|---|---|---|
| 952,536 | Lovatt | Mar. 22, 1910 |
| 1,314,217 | Roberts | Aug. 26, 1919 |
| 1,414,909 | Wasson | May 2, 1922 |
| 1,622,262 | Kindrat et al. | Mar. 22, 1927 |
| 1,749,233 | Scott | Mar. 4, 1930 |
| 1,926,848 | Giles | Sept. 12, 1933 |
| 1,992,554 | Tavender | Feb. 26, 1935 |
| 2,093,138 | Riesebeck | Sept. 14, 1937 |
| 2,501,434 | Cameron | Mar. 21, 1950 |
| 2,656,235 | Bastian | Oct. 20, 1953 |